(12) United States Patent
Kamada et al.

(10) Patent No.: US 7,363,996 B2
(45) Date of Patent: Apr. 29, 2008

(54) VEHICULAR DRIVE SYSTEM

(75) Inventors: Atsushi Kamada, Toyota (JP); Atsushi Tabata, Okazaki (JP); Yuji Inoue, Nisshin (JP); Ryuji Ibaraki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 274 days.

(21) Appl. No.: 11/260,313

(22) Filed: Oct. 28, 2005

(65) Prior Publication Data

US 2006/0102409 A1 May 18, 2006

(51) Int. Cl.
*B60K 1/00* (2006.01)
*B60K 6/00* (2007.10)

(52) U.S. Cl. .................... 180/65.2; 180/65.3

(58) Field of Classification Search ............. 180/65.2, 180/65.3; 903/923, 921, 917
See application file for complete search history.

(56) References Cited

U.S. PATENT DOCUMENTS

| | | | |
|---|---|---|---|
| 5,934,395 A | 8/1999 | Koide et al. | |
| 6,427,793 B1 * | 8/2002 | Hanada et al. | 180/65.2 |
| 6,554,736 B2 | 4/2003 | Takano et al. | |
| 6,808,470 B2 * | 10/2004 | Boll | 477/6 |
| 6,832,974 B2 * | 12/2004 | Kakamu et al. | 475/331 |
| 6,862,887 B2 | 3/2005 | Noreikat et al. | |
| 6,962,223 B2 * | 11/2005 | Berbari | 180/165 |
| 6,988,572 B2 * | 1/2006 | Tatara et al. | 180/65.2 |

| | | | |
|---|---|---|---|
| 2001/0016165 A1 * | 8/2001 | Shimabukuro et al. | 417/2 |
| 2003/0127262 A1 | 7/2003 | Noreikat et al. | |
| 2003/0217617 A1 * | 11/2003 | Sakamoto et al. | 74/665 B |

FOREIGN PATENT DOCUMENTS

| | | |
|---|---|---|
| DE | 196 06 771 C2 | 8/1997 |
| DE | 197 21 569 A1 | 12/1997 |
| DE | 696 11 296 T2 | 4/2001 |
| DE | 10160466 C1 | 6/2003 |
| DE | 601 05 483 T2 | 10/2005 |
| JP | 07-067208 | 3/1995 |
| JP | A-H07-096759 | 4/1995 |
| JP | 09-024743 | 1/1997 |
| JP | 2000094973 A | 4/2000 |
| JP | A 2000-245013 | 9/2000 |
| JP | A-2001-253255 | 9/2001 |

(Continued)

OTHER PUBLICATIONS

German Language Version of German Office Action, Appln. No. 10 2005 053 963.7-14, issued Feb. 27, 2007.

(Continued)

*Primary Examiner*—Christopher P. Ellis
*Assistant Examiner*—John R. Olszewski
(74) *Attorney, Agent, or Firm*—Kenyon & Kenyon LLP

(57) ABSTRACT

A second electric motor is arranged on a first axis on which an output shaft of the engine is arranged, a transmission is arranged on a second axis which is parallel with the first axis, and a clutch is arranged on the first axis to selectively connect and disconnect the second electric motor and the transmission to and from the engine. Power on the first axis is transmitted to an input shaft of the transmission via a power transmitting mechanism.

9 Claims, 8 Drawing Sheets

FOREIGN PATENT DOCUMENTS

| | | |
|---|---|---|
| JP | A-2004-122879 | 4/2004 |
| JP | 2004175320 A | 6/2004 |

OTHER PUBLICATIONS

English Translation of German Office Action, Appln. No. 10 2005 053 963.7-14, issued Feb. 27, 2007.

Chinese Language Version of Chinese Office Action, Appln. No. 200510115249.8 issued Apr. 13, 2007 English Language Translation of Chinese Office Action, Appln. No. 200510115249.8 issued Apr. 13, 2007.

Japanese Language Version of Japanese Office Action, Appln. No. 2004-329201 issued Apr. 24, 2007 English Language Translation of Japanese Office Action, Appln. No. 2004-329201 issued Apr. 24, 2007.

* cited by examiner

FIG. 3

|  | C1 | C2 | C3 | C4 | B1 | B2 | SPEED RATIO |
|---|---|---|---|---|---|---|---|
| P |  |  |  |  |  |  |  |
| Rev1 |  |  | O |  |  | O | 4.022 |
| Rev2 |  |  |  | O |  | O | 2.158 |
| N |  |  |  |  |  |  |  |
| 1st | O |  |  |  |  | O | 4.495 |
| 2nd | O |  |  |  | O |  | 2.697 |
| 3rd | O |  | O |  |  |  | 1.864 |
| 4th | O |  |  | O |  |  | 1.471 |
| 5th | O | O |  |  |  |  | 1.238 |
| 6th |  | O |  | O |  |  | 1.000 |
| 7th |  | O | O |  |  |  | 0.823 |
| 8th |  | O |  |  | O |  | 0.683 |

($\rho 1=0.463 \quad \rho 2=0.463 \quad \rho 3=0.415$)

VEHICULAR DRIVE SYSTEM

INCORPORATION BY REFERENCE

The disclosure of Japanese Patent Application No. 2004-329201 filed on Nov. 12, 2004 including the specification, drawings and abstract is incorporated herein by reference in its entirety.

BACKGROUND OF THE INVENTION

1. Field of the Invention

The invention relates to a vehicular drive system which is used in a vehicle such as an automobile.

2. Description of the Related Art

A vehicular drive system is known which includes an engine, two electric motors, a transmission, and a clutch that is operatively connected to the engine and can selectively connect and disconnect the transmission to and from the engine. One example of such a vehicular drive system is disclosed in US Patent Application Publication No. 2003/0127262A1. In this type of vehicular drive system, the clutch is provided in place of a fluid power transmitting device such as a torque converter, and the transmission shifts speeds while an input shaft thereof is operatively connected to the engine via the clutch.

With the vehicular drive system disclosed in US Patent Application Publication No. 2003/0127262A1, the omission of a torque converter enables the overall length to be made shorter. Despite this, however, the engine, the two electric motors, the clutch, and the transmission are all arranged on the same axis, which makes the overall length long. Thus, while it is possible to mount this vehicular drive system longitudinally in a FR (front-engine-rear-drive) vehicle, it is difficult to mount transversely in a FF (front-engine-front-drive) vehicle or a RR (rear-engine-rear-drive) vehicle. That is, this type of drive system may be difficult to mount when mounted with its axial direction parallel to the wheel axles. In addition, the drive system may also be difficult to mount longitudinally if the mounting space is limited.

SUMMARY OF THE INVENTION

In view of the foregoing circumstances, this invention thus aims to provide a vehicular drive system, the dimensions of which can be shortened in the transverse direction when the drive system is transverse mounted, i.e., in the axial direction.

Therefore, a first aspect of the invention relates to a vehicular drive system including an engine, a first electric motor, a second electric motor that is arranged on a first axis on which an output shaft of the engine is arranged, a transmission that is arranged on a second axis which is parallel with the first axis, and a clutch that is arranged on the first axis and can selectively connect and disconnect the second electric motor and the transmission to and from the engine, the transmission being arranged parallel to the engine and the clutch, and power transmitting means for transmitting power on the first axis to an input shaft of the transmission.

According to this structure, the clutch and the second electric motor are arranged on the first axis on which the output shaft of the engine is arranged, the transmission is arranged on the second axis which is different from the first axis, and the engine and the clutch on the first axis and the transmission on the second axis are parallel with each other. As a result, the dimensions in the transverse direction, i.e., the axial direction, of the vehicular drive system are able to be shortened.

Further, in the foregoing vehicular drive system according to the first aspect of the invention, the first electric motor may be arranged on the first axis.

According to the this structure, the first electric motor is also arranged on a different shaft than that of the transmission. As a result, the dimensions in the transverse direction, i.e., the axial direction, of the vehicular drive system are able to be shortened even more.

Further, in the foregoing vehicular drive system according to the first aspect of the invention, the clutch may be arranged on the opposite side of the first electric motor and the second electric motor from the engine.

Further, in the foregoing vehicular drive system according to the first aspect of the invention, the clutch may be arranged between the first electric motor and the second electric motor.

Further, in the foregoing vehicular drive system according to the first aspect of the invention, the power transmitting means may be arranged between the clutch and the second electric motor.

Next, a second aspect of the invention relates to a vehicular drive system including an engine, a first electric motor, a second electric motor that is arranged on a second axis which is parallel with a first axis on which an output shaft of the engine is arranged, a transmission that is arranged on the second axis, a clutch that is arranged on the first axis and can selectively connect and disconnect the second electric motor and the transmission to and from the engine, the transmission being arranged parallel to the engine and the clutch, and power transmitting means that is arranged between the second electric motor and the transmission and transmits power on the first axis to an input shaft of the transmission.

According to this structure, the second electric motor and the transmission are arranged on the second axis, which leaves some free space on the first axis. Thus, arranging the first electric motor on the first axis enables the space to be used effectively, thereby enabling the dimensions in the transverse direction, i.e., the axial direction, of the vehicular drive system to be shortened even more.

Further, in the foregoing vehicular drive system according to the second aspect of the invention, the first electric motor may be arranged on the first axis .

Further, in the foregoing vehicular drive system according to the first and second aspects of the invention, the transmission may include a planetary gear set and a brake which selectively stops the rotation of a rotating element of the planetary gear set, and the first or second electric motor arranged on the first axis and the brake may be arranged offset from one another in the axial direction.

The brake and the first and second electric motors are all elements that typically have large radial dimensions on their respective shafts. Therefore, offsetting those elements which have large radial dimensions in the axial direction on their respective shafts enables the shafts to be closer together, which enables the longitudinal dimensions of the vehicular drive system to be made smaller.

Further, in the foregoing vehicular drive system according to the first and second aspects of the invention, the power transmitting means may be arranged on the opposite side of the clutch from the engine.

Arranging the power transmitting means on the opposite side of the clutch from the engine results in the components being arranged in the order of engine, clutch, and power transmitting means. As a result, the power transmission path only doubles back once which is at the power transmitting means, which is good for the transmission of power.

Further, in the foregoing vehicular drive system according to the first and second aspects of the invention, the power transmitting means may include a gear set.

Using a gear set as the power transmitting means between the first axis and the second axis obviates the need for a third axis to reverse the rotation of the second axis, which is necessary when a belt is used as the power transmitting means. As a result, the total number of shafts is able to be reduced, which enables the dimensions in the longitudinal direction, i.e., the radial direction, of the drive system to be shortened even more.

The input shaft of the clutch and the output shaft of the engine may be directly connected or a pulsation absorbing damper (i.e., a pulsation reducing device) may be interposed between the two. Also, the clutch may be provided on the opposite side of the first electric motor and the second electric motor from the engine on the first axis, i.e., on the downstream side in the power transmission path from the first electric motor and the second electric motor on the first axis. Alternatively, the clutch may be provided between the first electric motor and the second electric motor, or between the first electric motor and the power transmitting means.

At least one of the first electric motor and the second electric motor may be a so-called motor-generator which has a power generating function, or both may be motor-generators. An electric motor other than the first and second electric motors may also be provided.

When the second electric motor is arranged on the first axis, the power transmitting means may be arranged between the clutch and the second electric motor. When the second electric motor is arranged on the second axis, the power transmitting means may be arranged between the second electric motor and the transmission. It is also possible to arrange the power transmitting means at one end, in the axial direction, of the vehicular drive system irrespective of which axis the second electric motor is arranged on.

The transmission is not limited so long as it can change the input rotation speed by a plurality of speed ratios. For example, the transmission can be a planetary gear type stepped transmission or a toroidal-type continuously variable transmission.

As the power transmitting means, a belt or chain may also be used, for example.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 3 is a clutch and brake application chart showing the relationship between the speed of the automatic transmission shown in FIG. 1 and the combination of operations of hydraulic friction apply devices necessary to establish those speeds;

DETAILED DESCRIPTION OF THE PREFERRED EMBODIMENTS

Next, exemplary embodiments of the invention will be described in detail with reference to the accompanying drawings.

Figure 1:
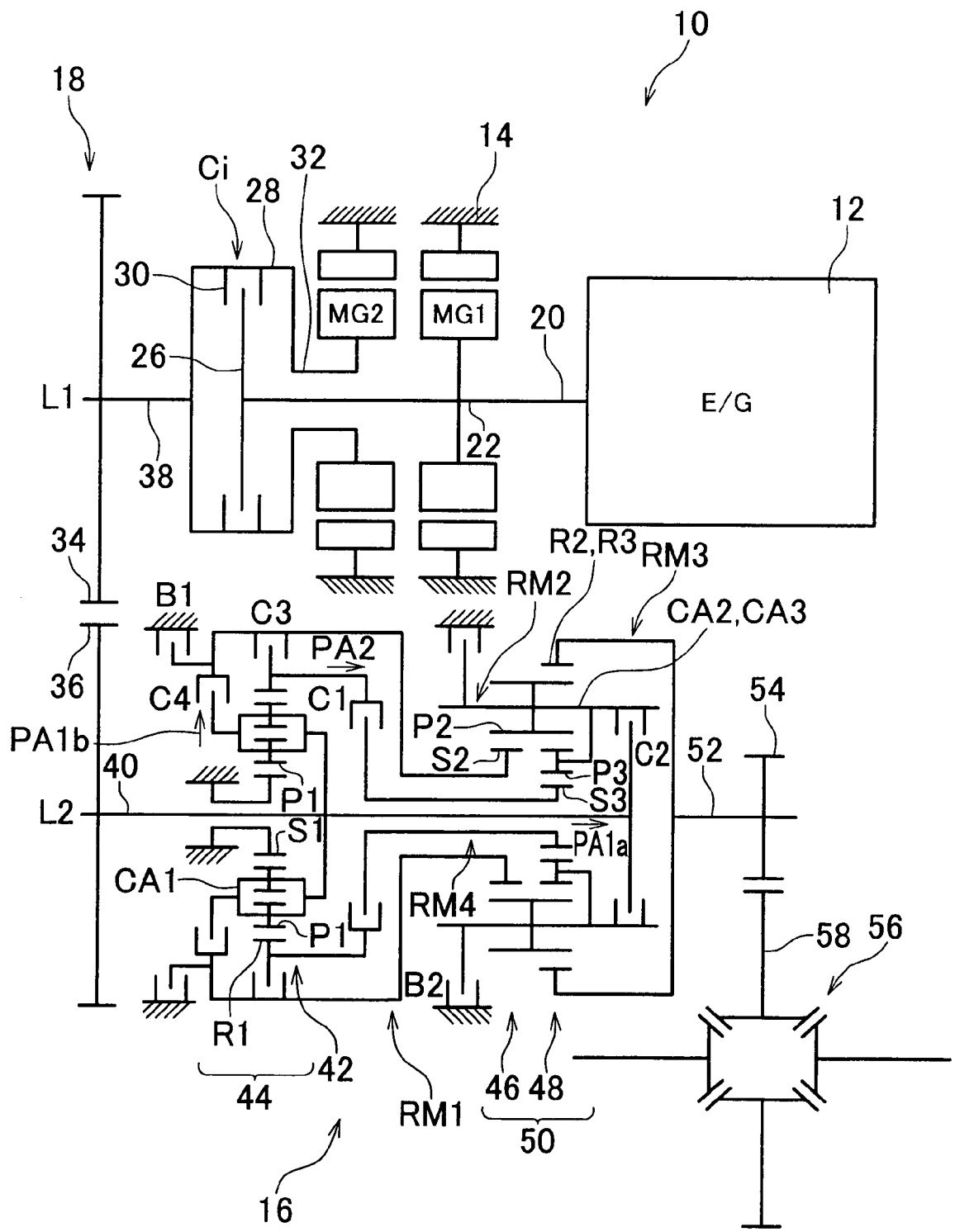
FIG. 1 is a skeleton view of the structure of a vehicular drive system to which the invention has been applied.

FIG. 1 is a skeleton view of the structure of a vehicular drive system (hereinafter simply referred to as "drive system") 10 to which the invention has been applied. This drive system 10 includes an engine 12 and a transmission case 14 which is a non-rotating member mounted to a vehicle body. The transmission case 14 houses a first motor-generator MG1 which serves as a first electric motor, a second motor-generator MG2 which serves as a second electric motor, a lock-up clutch Ci, a stepped automatic transmission (hereinafter simply referred to as "automatic transmission") 16 which serves as a transmission, and a counter gear set 18 which serves as power transmitting means, and the like.

The first motor-generator MG1, the second motor-generator MG2, and the lock-up clutch Ci are all arranged in that order from the upstream side of the power transmission path (i.e., from the engine 12 side) on a first axis L1. Meanwhile, the automatic transmission 16 is arranged on a second axis L2 which is parallel to the first axis L1.

A crankshaft 20, i.e., the output shaft of the engine 12, is also arranged on the first axis L1. A rotating shaft 22 of the first motor-generator MG1 is connected to the crankshaft 20 via a flywheel 62 and a transmitting member 64 or a damper 65, not shown in FIG. 1 (see FIG. 5). Thus, when the rotating shaft 22 of the first motor-generator MG1 is directly connected to the crankshaft 20 of the engine 12 without the use of a belt or the like, the crankshaft 20 is directly rotated by the rotating shaft 22 of the first motor-generator MG1. Therefore, the engine is able to be started up easily even when a large amount of force is required at engine startup, such as when the engine 12 is cold. Further, this rotating shaft 22 also functions as an input shaft of the lock-up clutch Ci.

The lock-up clutch Ci is, for example, a multiple disc type hydraulic friction apply device in which the discs are frictionally engaged with each other by a hydraulic cylinder. This lock-up clutch Ci includes a friction plate 26 which rotates together with the input shaft which is the prime mover shaft, i.e., the rotating shaft 22, and friction plates 30 which rotate together with a clutch drum 28 which is a rotated body. The clutch drum 28 is connected to a rotor shaft 32 of the second motor-generator MG2. This lock-up clutch Ci selectively connects and disconnects the first motor-generator MG1 and the automatic transmission 16 to and from the engine 12. Accordingly, the lock-up clutch Ci also functions as an input clutch that inputs power from the engine 12 and the first motor-generator MG1 to the automatic transmission 16.

The counter gear set 18 includes a drive gear 34 and a driven gear 36 which are in mesh with each other. The drive gear 34 is provided on the output shaft 38 of the lock-up clutch Ci so as not to be able to rotate with respect to the output shaft 38, and is on the opposite side of the lock-up clutch Ci from the engine 12 on the first axis L1, i.e., on the downstream side of the lock-up clutch Ci on the first axis L1 in the power transmission path. The driven gear 36 is provided on one end of the input shaft 40 of the automatic transmission 16 on the second axis L2, so as not to be able to rotate with respect to the input shaft 40. This counter gear set 18 transmits rotation from the rotor shaft 32 of the second motor-generator MG2, which is a rotating shaft on the first axis L1, to the input shaft 40 of the automatic transmission 16 provided on the second axis L2. Because the counter gear set 18 makes up one end of the drive system 10, the lock-up clutch Ci, which is arranged next to the counter gear set 18 is also close to the transmission case 14. Therefore, hydraulic fluid can be supplied to the lock-up clutch Ci via the transmission case 14 or a support member fitted in the transmission case 14. Providing hydraulic fluid via the transmission case 14 or the support member in this way enables the oil supply path to be simplified compared with when hydraulic fluid is supplied via a shaft.

The automatic transmission 16 is provided to the right of the counter gear set 18 on the second axis L2 in the drawing, i.e., on the same side of the counter gear set 18 as is the engine 12. Therefore, the automatic transmission 16 is arranged in a position in which it substantially overlaps in the axial direction with the engine 12, the first motor-generator MG1, the second motor-generator MG2, and the lock-up clutch Ci on the first axis L1. That is, the automatic transmission 16 is arranged parallel with the engine 12, the first motor-generator MG1, the second motor-generator MG2, and the lock-up clutch Ci on the first axis L1.

This automatic transmission 16 includes a first transmitting portion 44 and a second transmitting portion 50. The main component of the first transmitting portion 44 is a first planetary gear set 42. The main components of the second transmitting portion 50 are a second planetary gear set 46 and a third planetary gear set 48.

The first planetary gear set 42 is a double pinion type planetary gear set and includes a sun gear S1, a plurality of sets of pinions gears P1 which are in mesh with each other, a carrier CA1 which rotatably and revolvably supports the pinion gears P1, and a ring gear R1 which is in mesh with the sun gear S1 via the pinion gears P1. The carrier CA1 is connected to, and rotatably driven by, the input shaft 40, while the sun gear S1 is integrally fixed to the transmission case 14 so as not to be able to rotate. The ring gear R1 functions as an intermediate output member and slows the rotation input from the input shaft 40 and transmits it to the second transmitting portion 50. In this exemplary embodiment, there is a first intermediate output path PA1 which transmits rotation from the input shaft 40 to the second transmitting portion 50 without changing the rotation speed. This path transmits rotation at a predetermined constant speed ratio (=1.0). This first intermediate output path PA1 includes a direct path PA1$a$ and an indirect path PA1$b$. The direct path PA1$a$ transmits rotation from the input shaft 40 to the second transmitting portion 50 without passing through the first planetary gear set 42. The indirect path PA1$b$ transmits rotation from the input shaft 40 to the second transmitting portion 50 via the carrier CA1 of the first planetary gear set 42. There is also a second intermediate output path PA2 which transmits rotation from the input shaft 40 to the second transmitting portion 50 via the carrier CA1, the pinion gears P1 arranged on the carrier CA1, and the ring gear R1. This path slows the rotation input from the input shaft 40 and transmits it at a larger speed ratio (>1.0) than does the first intermediate output path PA1.

The second planetary gear set 46 is a single pinion type planetary gear set which includes a sun gear S2, a pinion gear P2, a carrier CA2 which rotatably and revolvably supports that pinion gear P2, and a ring gear R2 which is in mesh with the sun gear S2 via the pinion gear P2. The third planetary gear set 48 is a double pinion type planetary gear set and includes a sun gear S3, a plurality of sets of pinion gears P2 and P3 which are in mesh with each other, a carrier CA3 which rotatably and revolvably supports those pinion gears P2 and P3, and a ring gear R3 which is in mesh with the sun gear S3 via the pinion gears P2 and P3.

In the second planetary gear set 46 and the third planetary gear set 48, four rotating elements RM1, RM2, RM3, and RM4 are formed by common use of the carriers CA2 and CA3 which rotatably support the pinion gear P2, and the ring gears R2 and R3. That is, the sun gear S2 of the second planetary gear set 46 serves as the first rotating element RM1, the carrier CA2 of the second planetary gear set 46 and the carrier CA3 of the third planetary gear set 48 are integrally connected together and serves as the second rotating element RM2, the ring gear R2 of the second planetary gear set 46 and the ring gear R3 of the third planetary gear set 48 are integrally connected together and serve as the third rotating element RM3, and the sun gear S3 of the third planetary gear set 48 serves as the fourth rotating element RM4.

The first rotating element RM1 (i.e., the sun gear S2) is selectively held to the transmission case 14 by a first brake B1, which prevents it from rotating. The first rotating element RM1 (i.e., the sun gear S2) is also selectively connected to the ring gear R1 of the first planetary gear set 42, i.e., the intermediate output member, via a third clutch C3 (i.e., the second intermediate output path PA2). The first rotating element RM1 (i.e., the sun gear S2) is further selectively connected to the carrier CA1 of the first planetary gear set 42 via a fourth clutch C4 (i.e., the indirect path PA1$b$ of the first intermediate output path PA1). The second rotating element RM2 (i.e., the carriers CA2 and CA3) is selectively held to the transmission case 14 by a second brake B2, which prevents it from rotating, and is also selectively connected to the input shaft 40 via a second clutch C2 (i.e., the direct path PA1$a$ of the intermediate output path PA1). The third rotating element RM3 (i.e., the ring gears R2 and R3) is integrally connected to an output shaft 52 of the automatic transmission 16 and outputs rotation. The fourth rotating element RM4 (i.e., the sun gear S3) is connected to the ring gear R1 via a first clutch C1. The brakes B1 and B2 and the clutches C1 to C4 are all multiple disc hydraulic friction apply devices that are frictionally engaged by means of a hydraulic cylinder.

The output shaft 52 of the automatic transmission 16 is provided on the same end side of the drive system 10 as the engine 12 and has a drive pinion gear 54 which is unable to rotate relative to the output shaft 52. This drive pinion gear 54 is in mesh with a ring gear 58 that rotates together with a differential gear unit 56. With the vehicular drive system 10 having this kind of structure, driving force generated by rotation of the engine, the first motor-generator MG1, and the second motor-generator MG2, which are all arranged on the first axis L1, is transmitted to the second axis L2 by the counter gear set 18 where it is sent in the opposite direction, axially, i.e., back toward the side where the engine 12 is located, and output from the output shaft 52 of the automatic transmission 16 provided on the same end side, in the axial direction, as the engine 12.

Figure 2:
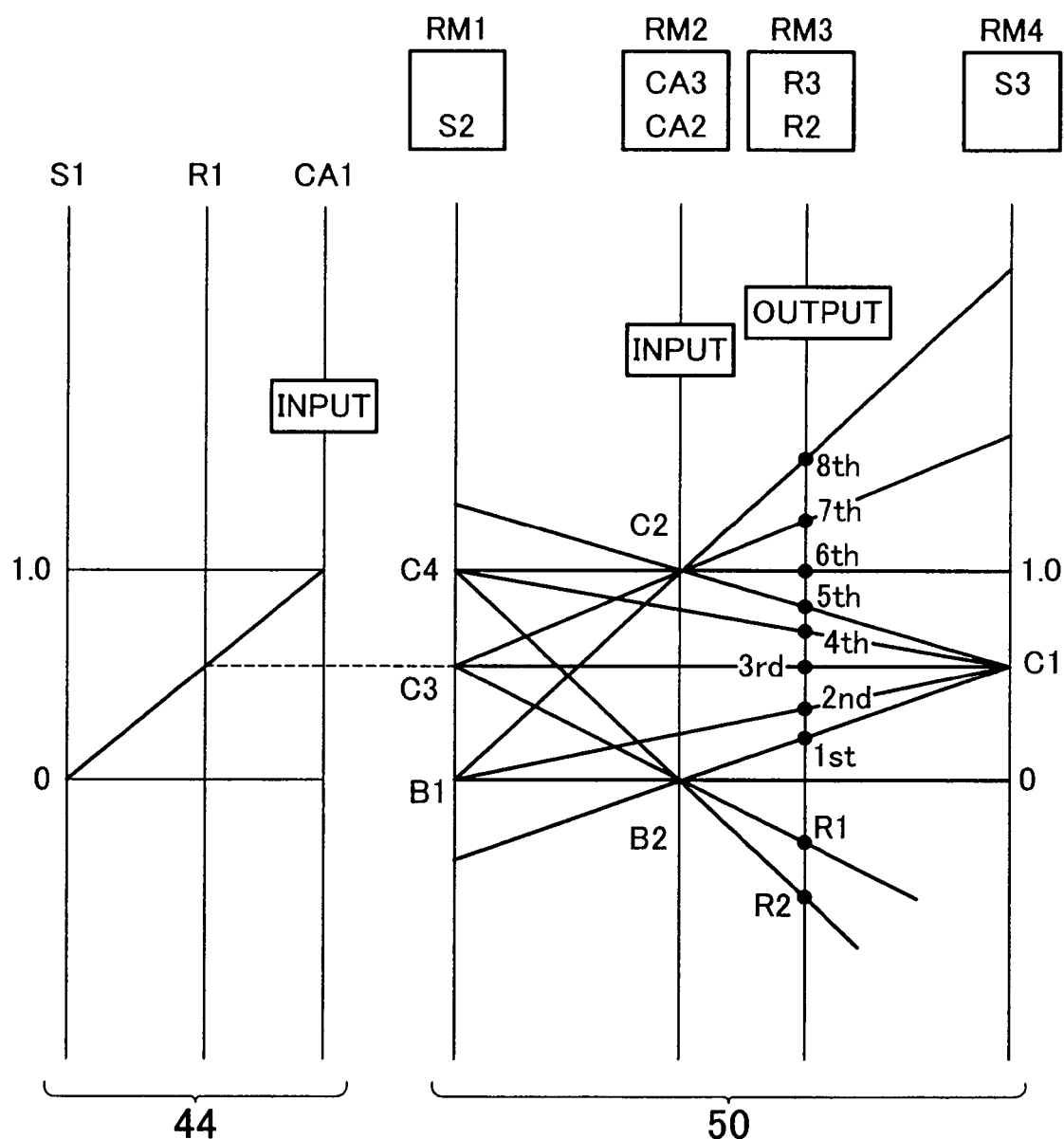
FIG. 2 is an alignment graph illustrating the operations of an automatic transmission shown in FIG. 1.

FIG. 2 is an alignment graph that is able to illustrate, with straight lines, the rotation speed of each rotating element of the first transmitting portion 44 and the second transmitting portion 50. The lower horizontal line represents a rotation speed of "0" while the upper horizontal line represents a rotation speed of "1.0", i.e., a rotation speed equal to that of the input shaft 40. Also, the vertical lines on the first transmitting portion 44 side represent, in order from left to right, the sun gear S1, the ring gear R1, and the carrier CA1. The distances between those vertical lines are set according to the gear ratio ρ1 (=the number of teeth on the sun gear S1/the number of teeth on the ring gear R1) of the first planetary gear set 42. In FIG. 2, the speed ratio ρ1 equals 0.463, for example. The four vertical lines on the second transmitting portion 50 side represent, in order from left to right, the first rotating element RM1 (i.e., the sun gear S2), the second rotating element RM2 (i.e., the carrier CA2 and the carrier CA3), the third rotating element RM3 (i.e., the ring gear R2 and the ring gear R3), and the fourth rotating element RM4 (i.e., the sun gear S3). The distances between those vertical lines are set according to the speed ratio ρ2 of the second planetary gear set 46 and the speed ratio ρ3 of the third planetary gear set 48. In FIG. 2, ρ2 equals 0.463 and ρ3 equals 0.415, for example.

As can be seen from the alignment graph, eight forward speeds, i.e., a first forward speed "1st" through an eighth forward speed "8th", and two reverse speeds, i.e., a first reverse speed "Rev1" and a second reverse speed "Rev2" can be established depending on the operative state (applied or released) of the clutches C1 to C4 and the brakes B1 and B2.

FIG. 3 is a clutch and brake application chart showing the relationship between the apply devices when each speed is established and the speed ratio of each speed. In the drawing, a circle indicates an applied state and the absence of a circle indicates a released state. The speed ratio of each speed is set appropriately by the speed ratio ρ1 of the first planetary gear set 42, the speed ratio ρ2 of the second planetary gear set 46, and the speed ratio ρ3 of the third planetary gear set 48. If ρ1=0.463, ρ2=0.463, and ρ3=0.415 as shown in FIG. 3, then the value of the speed ratio steps (i.e., the ratio of the speed ratios between the speeds) is generally appropriate, and the total speed ratio range (=4.495/0.683) is large, around 6.581. Further, the speed ratios of the reverse speeds "Rev1" and "Rev2" are also suitable. As a result, appropriate overall speed ratio characteristics are able to be obtained. As shown in FIG. 3, the automatic transmission 16 is able to realize a large speed ratio range with appropriate speed ratio steps. Furthermore, speeds can be shifted by simply changing the operative state of any two of the four clutches C1 to C4 and the two brakes B1 and B2. As a result, shift control is simplified and shift shock is able to be suppressed.

Figure 4:
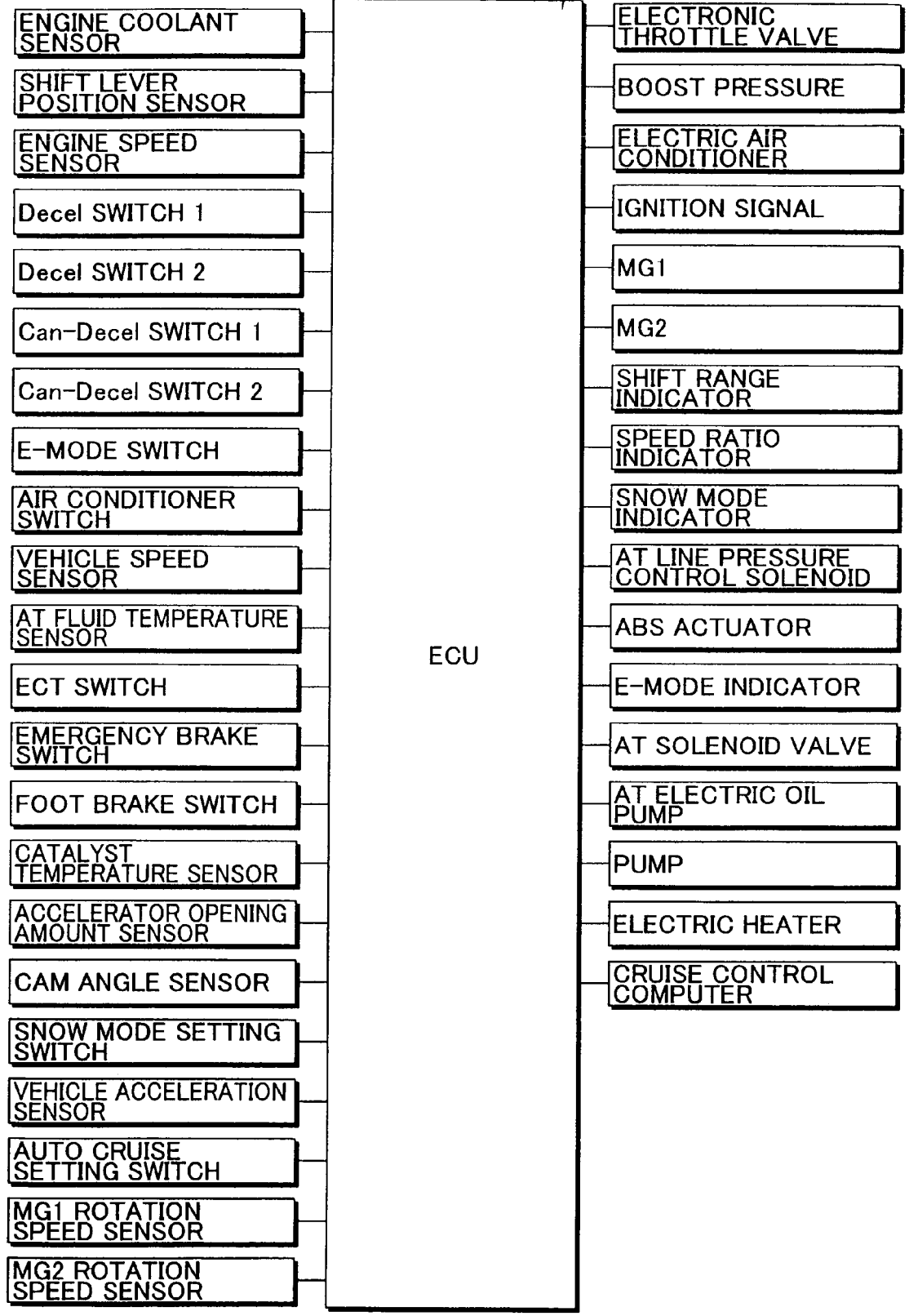
FIG. 4 is a view illustrating signals both input to and output from an ECU for controlling the drive system shown in FIG. 1.

FIG. 4 is a view illustrating signals both input to and output from an electronic control unit (ECU) 60 for controlling the drive system 10 according to this exemplary embodiment. The ECU 60 includes a so-called microcomputer that includes a CPU, ROM, RAM, and an input/output interface and the like. The ECU 60 runs the vehicle in a plurality of operating modes in which the engine 12 and the motor-generators MG1 and MG2 are in different operating states, by executing output control of the engine 12, shift control of the automatic transmission 16, and powering/regenerating control of the motor-generators MG1 and MG2, and the like by performing signal processing according to a program stored beforehand in the ROM while using the temporary storage function of the RAM.

Various signals output from the various sensors and switches shown in FIG. 4 are input to the ECU 60. Examples of these signals include a signal indicative of the engine coolant temperature, a signal indicative of the shift lever position, a signal indicative of the engine speed NE, i.e., the rotation speed of the engine 12, Decel1 and Decel2 signals indicative of target values of vehicle deceleration by powering/regenerating control of the engine brake and the motor-generators MG1 and MG2, i.e., signals directing an increase in the target deceleration, Can-Decel1 and Can-Decel2 signals directing a decrease in the target deceleration, a signal directing a deceleration control mode (i.e., E-mode) for controlling the target deceleration, an air conditioner signal indicative of operation of an air conditioner, a vehicle speed signal which corresponds to the rotation speed of the output shaft 52, an AT fluid temperature signal indicative of the hydraulic fluid in the automatic transmission 16, a signal indicative of an emergency brake operation, and a signal indicative of a foot brake operation. Other examples of signals input to the ECU 60 include a catalyst temperature signal indicative of the temperature of a catalyst, an accelerator opening amount signal indicative of the operating amount of an accelerator pedal, a cam angle signal, a snow mode setting signal indicative of a snow mode setting, an acceleration signal indicative of forward/backward acceleration of the vehicle, an auto cruise signal indicative of auto cruise running, a signal indicative of a rotation speed NMG1 of the first motor-generator MG1, and a signal indicative of a rotation speed NMG2 of the second motor-generator MG2.

In addition, various signals are also output from the ECU 60. Examples of these signals include a drive signal to a throttle actuator which controls the opening amount of a throttle valve, a boost pressure adjust signal for adjusting boost pressure, an electric air conditioner drive signal for operating an electric air conditioner, an ignition signal which directs the ignition timing of the engine 12, a command signal which directs operation of the motor-generators MG1 and MG2, a shift lever position (i.e., operating position) indication signal for operating a shift indicator, a speed ratio indication signal for indicating the speed ratio, a snow mode indication signal for indicating when the snow mode is set, an ABS activation signal for activating an ABS actuator which prevents the wheels of the vehicle from slipping during braking, an E-mode indication signal which indicates that the E-mode is selected, a valve command signal which activates an electromagnetic valve in the hydraulic pressure control circuit for controlling a hydraulic pressure actuator of hydraulic friction engagement devices provided in the transmission 16 and the lock-up clutch Ci, a drive command signal for activating an electric hydraulic pump which is the source of hydraulic pressure in the hydraulic pressure control circuit, a signal for driving an electric heater, and a signal to a cruise control computer.

The plurality of operating modes which are controlled by the ECU 60 includes an engine running mode, an engine plus motor running mode, a motor running mode, and a deceleration control mode. In the engine running mode, the lock-up clutch Ci is applied to connect the engine 12, and the vehicle is run by driving force generated by the engine 12. When not all of the power generated by the engine 12 is being used to drive the vehicle, for example, the first electric motor MG1 can be controlled to regenerate that power as necessary and use it to charge the battery. In the engine plus motor running mode, the lock-up clutch Ci is applied to connect the engine 12, and the vehicle is run by the driving force generated by both the engine 12 and the second electric motor MG2. In the motor running mode, the lock-up clutch Ci is released to disconnect the engine 12, and the vehicle is run by the driving force generated by the second electric motor MG2. When the state-of-charge SOC of the battery is low, for example, the engine 12 is operated as necessary and the first electric motor MG1 is controlled to regenerate power and charge the battery. In the deceleration control mode, the lock-up clutch Ci is applied to connect the engine 12 and the supply of fuel to the engine 12 is stopped by a fuel cut to induce engine braking, while the second electric motor MG2 is controlled to either produce or regenerate power, thereby generating a predetermined power source brake. The first electric motor MG1 can also be used to adjust the power source brake by also being controlled to either produce or regenerate power, just like the second electric motor MG2.

Figure 5:
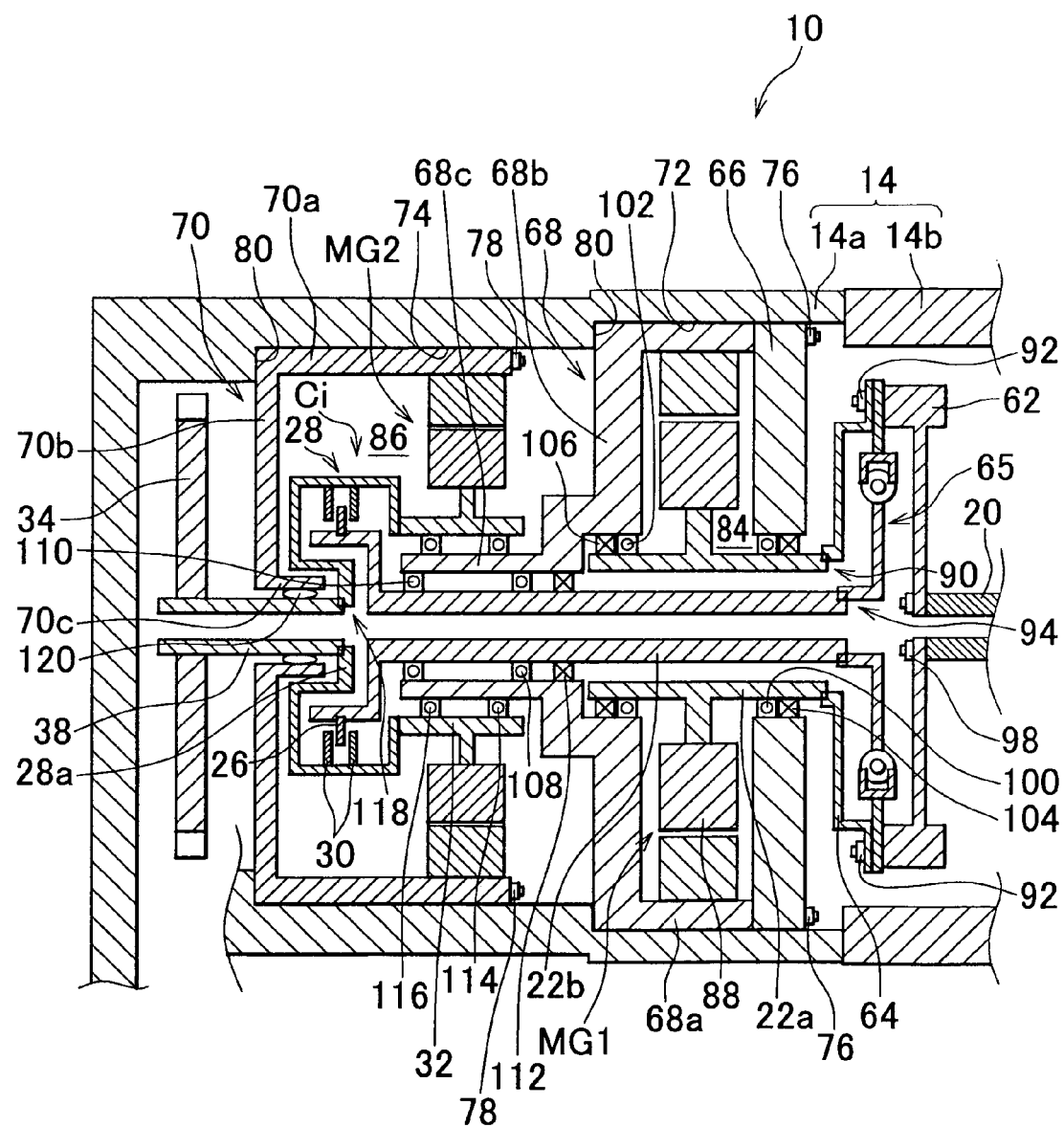
FIG. 5 is a simplified sectional view of a structure of the drive system shown in FIG. 1.

FIG. 5 is a simplified sectional view of a structure of the drive system 10. As shown in FIG. 5, the transmission case 14 has a first case 14*a* and a second case 14*b* which are joined together with a bolt, not shown. The first case 14*a* houses the first motor-generator MG1 and the second motor-generator MG2 and the like, while the second case houses the flywheel 62, the transmitting member 64, and the damper 65 and the like. The second case 14*b* is integrated with the engine 12.

Housed in the first case 14*a*, in order from the side nearest the engine 12, are a first support wall 66, a second support wall 68, and a third support wall 70. These first, second, and third support walls 66, 68, and 70 have a bell and spigot configuration with respect to the first case 14*a*. That is, the outer peripheral surfaces of the first and second support walls 66 and 68 abut against a first abutting surface 72 which is formed on, and parallel in the axial direction with, the inner peripheral surface of the first case 14*a*. The outer peripheral surface of the third support wall 70 abuts against a second abutting surface 74 which is formed farther to the rear of the first abutting surface 72 in the first case 14*a* and is parallel in the axial direction, just like the first abutting surface 72, but which has a smaller diameter than does the first abutting surface 72. When not fixed in place by bolts 76 and 78, the support walls 66, 68, and 70 can slide with respect to the first case 14*a*. The positions, in the radial direction, of the first through the third support walls 66, 68, and 70 are determined by this bell and spigot configuration.

The first support wall 66 is a generally disc-shaped member. The second support wall 68, on the other hand, includes an outer peripheral side cylindrical portion 68*a* which abuts against the first abutting surface 72, a connecting portion 68*b* which is connected at one end to the end of the outer peripheral side cylindrical portion 68*a* on the second motor-generator MG2 side and which extends inward in the radial direction, and a shaft portion 68*c* which is connected to the other end, i.e., the inner peripheral end, of the connecting portion 68*b* and extends in the direction opposite that of the outer peripheral side cylindrical portion 68*a*. Further, the third support wall 70 includes an outer peripheral side cylindrical portion 70*a* which abuts against the second abutting surface 74, a connecting portion 70*b* which is connected to the end of the outer peripheral side cylindrical portion 70*a* on the side opposite the first motor-generator MG1 and which extends inward in the radial direction, and a shaft portion 70*c* which is connected to the other end, i.e., the inner peripheral end, of the connecting portion 70*b* and extends in the same direction as the outer peripheral side cylindrical portion 70*a*.

Also, the first case 14*a* has a first radial surface 80 in the radial direction which connects the first abutting surface 72 and the second abutting surface 74 together, and a second radial surface 82 which extends toward the inner radial side from the other end of the second abutting surface 74. The position, in the axial direction, of the second support wall 68 is determined by the second support wall 68 abutting against the first radial surface 80. Similarly, the position, in the axial direction, of the third support wall 70 is determined by the third support wall 70 abutting against the second radial surface 82. The position, in the axial direction, of the first support wall 66 is determined by the first support wall 66 abutting against a side surface of the second support wall 68 that is opposite the side surface of the second support wall 68 that abuts against the first radial surface 80. The first support wall 66 and the second support wall 68 are fixed to the first case 14*a* by the bolt 76 which passes through, in the axial direction, the first support wall 66 and the outer peripheral side cylindrical portion 68*a* of the second support wall 68 and screws into the first case 14*a*. Similarly, the third support wall 70 is fixed to the first case 14*a* by the bolt 78 which passes through, in the axial direction, the outer peripheral side cylindrical portion 70*a* of the third support wall 70 and screws into the first case 14*a*.

The first support wall 66 and the second support wall 68 define a first housing chamber 84, while the second support wall 68, the third support wall 70, and the first case 14*a* define a second housing chamber 86. The first housing chamber 84 houses the first motor-generator MG1, while the second housing chamber 86 houses the lock-up clutch Ci on the third support wall 70 side and the second motor-generator MG2 on the second support wall 68 side. An oil pump for supplying hydraulic fluid to the lock-up clutch Ci can be used as the third support wall 70, which enables the number of support walls to be reduced as compared to if another support wall were provided.

The rotating shaft rotating shaft 22 of the first motor-generator MG1 includes a rotor shaft 22*a* and an input shaft 22*b* which is arranged inside the rotor shaft 22*a* but which does not contact the rotor shaft 22*a*. The rotational driving force of the rotor 88 of the first motor-generator MG1 is input from the rotor shaft 22*a* to the input shaft 22*b* via the transmitting member 64 which is fitted with a spline 90 to the engine 12 side end of the rotor shaft 22*a*, and the damper 65 which is integrated with the transmitting member 64 by a bolt 92 and fitted to the input shaft 22*b* with a spline 94.

The transmitting member 64 and the damper 65 are fixed to an outer peripheral portion of the flywheel 62 by the bolt 92. Also, the flywheel 62 is fixed at an inner peripheral end portion thereof to the crankshaft 20 by a bolt 98. The transmitting member 64, the damper 65, and the flywheel 62 are all members which are housed in the second case 14*b*, while the rotor shaft 22*a*, which is fitted to the transmitting member 64, and the input shaft 22*b*, which is fitted to the damper 65, are housed in the first case 14*a*. The transmitting member 64 and the rotor shaft 22*a* are fitted together with the spline 90 and the damper 65 and the input shaft 22*b* are fitted together with the spline 94, which facilitates assembly of the first case 14*a* to the second case 14*b*.

The rotor shaft 22*a* is supported at one end by the first support wall 66 via a bearing 100 provided at the inner peripheral surface of the first support wall 66, and at the other end by the second support wall 68 via a bearing 102 provided at the inner peripheral surface of the connecting portion 68*b* of the second support wall 68. Supporting the rotor shaft 22*a* by the first support wall 66 and the second support wall 68 in this way makes the first housing chamber 84 a closed space. As a result, once the rotor shaft 22*a* is assembled, foreign matter is prevented from adhering to the rotor 88 inside the first housing chamber 84 even before the first case 14a and the second case 14b are joined together. Furthermore, the positions, in the radial direction, of the first support wall 66 and the second support wall 68 which support the rotor shaft 22a at both ends are determined by the first support wall 66 and the second support wall 68 abutting against the first abutting surface 72 of the first case 14a. That is, the positions, in the radial direction, of the first support wall 66 and the second support wall 68 are determined with reference to the same surface of the same member. Therefore, the axial precision of the rotor shaft 22a that is supported by the first support wall 66 and the second support wall 68 is improved compared with a case in which the positions, in the radial direction, of the first support wall 66 and the second support wall 68 are determined with reference to different members.

Moreover, seal members 104 and 106 are provided adjacent to, but on opposite sides of, the bearings 100 and 102, between the inner peripheral surface of the first support wall 66 and the rotor shaft 22a, and between the inner peripheral surface of the connecting portion 68b of the second support wall 68 and the rotor shaft 22a, respectively. These seal members 104 and 106 seal off the first housing chamber 84. In FIG. 5, the bearing 100 and the seal member 104 are separate members, as are the bearing 102 and the seal member 106. Alternatively, however, the bearing 100 and the seal member 104 may be integrated together, and the bearing 102 and the seal member 106 may be similar.

The input shaft 22b extends through the rotor shaft 22a and the shaft portion 68c of the second support wall 68. This input shaft 22b is supported by the second support wall 68 via a pair of bearings 108 and 110, one of which is provided near one side, in the axial direction, of the shaft portion 68c of the second support wall 68 and the other of which is provided near the other side, in the axial direction, of the shaft portion 68c of the second support wall 68. Furthermore, a seal member 112 is provided between the input shaft 22b and the shaft portion 68c of the second support wall 68 toward the engine 12 side of the bearing 108 which is the bearing, from among the pair of bearings 108 and 110, that is on the engine 12 side. This seal member 112 seals off the second housing chamber 86.

In this way, the first housing chamber 84 and the second housing chamber 86 are sealed spaces so even if water enters between the first case 14a and the second case 14b, the first motor-generator MG1 and the second motor-generator MG2, which are electrical components, will not get wet.

The rotor shaft 32 of the second motor-generator MG2 is supported at both ends by the shaft portion 68c of the second support wall 68 via a pair of bearings 114 and 116 which are arranged at the outer peripheral surface of that shaft portion 68c. In this way, the second support wall 68 supports both the input shaft 22b and one end portion of the rotor shaft 22a of the first motor-generator MG1, which reduces the number of support walls compared to a case in which support walls are provided separately to support these shafts 32, 22a, and 22b.

The clutch drum 28 is fixed to one end of the rotor shaft 32. The inner peripheral end of a flange portion 28a of the clutch drum 28 is fitted by a spline 118 to the output shaft 38 of the lock-up clutch Ci. A needle bearing 120 is provided between the output shaft 38 and a shaft portion 70c of the third support member 70.

According to the exemplary embodiment described above, the second motor-generator MG2 and the lock-up clutch Ci are provided on the first axis L1 on which the crankshaft 20 of the engine 12 is arranged. Furthermore, the automatic transmission 16, which has long dimensions in the axial direction, is arranged on the second axis L2 which is different from the first axis L1, and the engine 12 and the lock-up clutch Ci on the first axis L1 are arranged parallel to the automatic transmission 16 on the second axis L2. As a result, the dimensions in the transverse direction, i.e., the dimensions in the axial direction, of the vehicular drive system 10 are able to be shortened.

Moreover, the first motor-generator MG1 is also arranged on the first axis L1 of a different shaft than that of the automatic transmission 16 which is long in the axial direction. As a result, the dimensions in the transverse direction, i.e., the dimensions in the axial direction, of the vehicular drive system 10 are able to be shortened even more.

Also according to this exemplary embodiment, the engine 12, lock-up clutch Ci, and counter gear set 18, are arranged in that order from the upstream side of the power transmission path. As a result, the power transmission path only doubles back once, which is at the counter gear set 18, resulting in good power transmission.

Also according to this exemplary embodiment, the counter gear set 18 is used as the power transmitting means so a third axis to reverse the rotation of the second axis L2, such as when a belt is used as the power transmitting means, is unnecessary. As a result, the total number of shafts is able to be reduced, which enables the dimensions in the longitudinal direction, i.e., the radial direction, of the drive system 10 to be shortened.

Next, a second exemplary embodiment of the invention will be described. In the following description, members in the second exemplary embodiment that are the same as those in the first exemplary embodiment are denoted with the same reference numerals and characters, and descriptions thereof are omitted.

Figure 6:
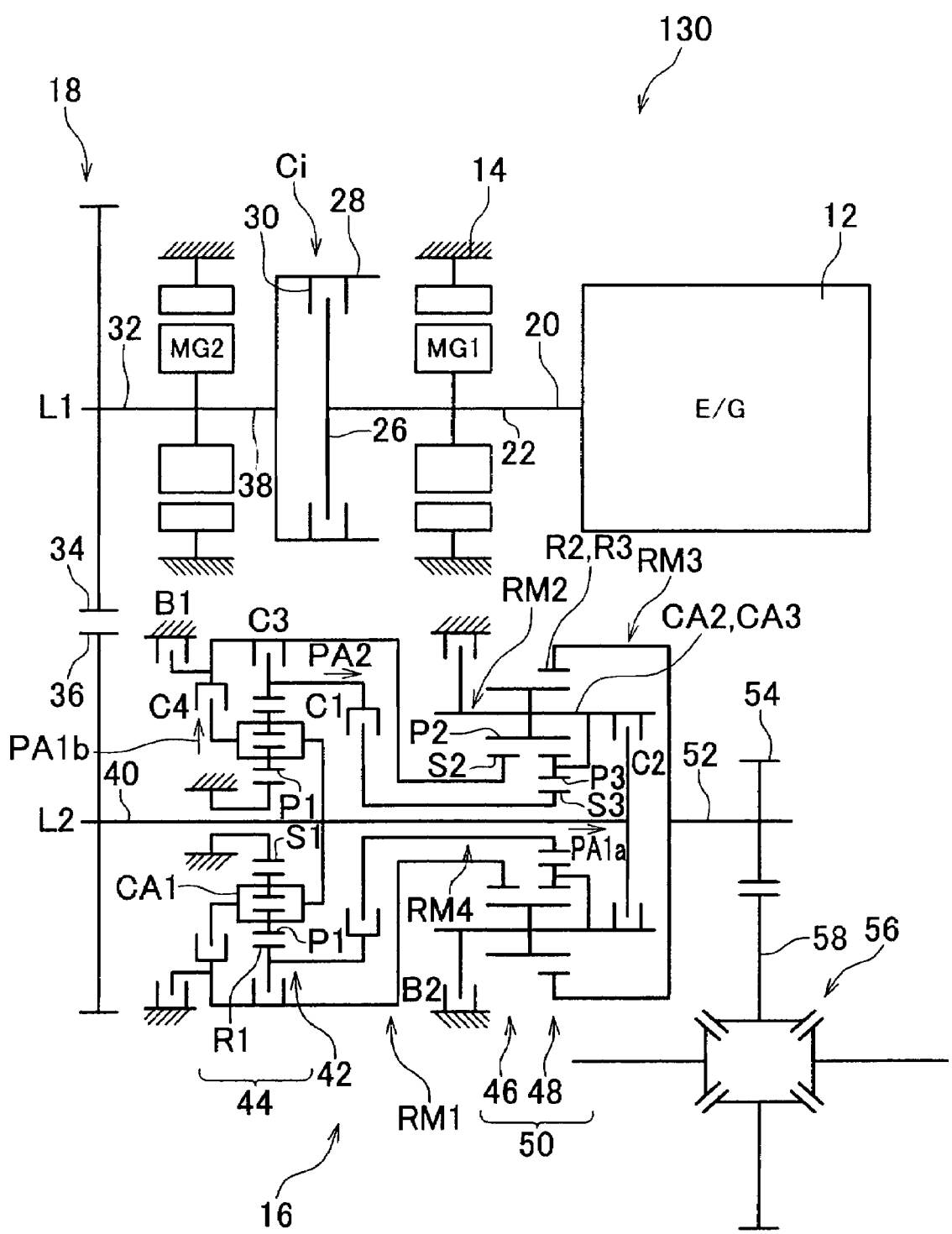
FIG. 6 is a skeleton view of the structure of a vehicular drive system according to a second exemplary embodiment of the invention.

FIG. 6 is a skeleton view of the structure of a vehicular drive system (hereinafter simply referred to as "drive system") 130 according to the second exemplary embodiment of the invention. The only difference between the drive system 130 and the drive system 10 of the first exemplary embodiment is that the positions of the second motor-generator MG2 and the lock-up clutch Ci are reversed. That is, in the drive system 130 according to the second exemplary embodiment, the order of the components on the first axis L1 from the upstream side of the power transmission path is as follows: the engine 12, the first motor-generator MG1, the lock-up clutch Ci, the second motor-generator MG2, and the drive gear 34 of the counter gear set 18.

The output shaft 38 of the lock-up clutch Ci and the rotor shaft 32 of the second motor-generator MG2 are connected in a manner such that they are unable to rotate with respect to one another. The drive gear 34 of the counter gear set 18 is provided on the rotor shaft 32 so as not to be able to rotate with respect to the rotor shaft 32.

Thus, because the drive system 130 according to the second exemplary embodiment differs from the drive system 10 according to the first exemplary embodiment only in that the positions of the second motor-generator MG2 and the lock-up clutch Ci are reversed, the advantages obtained by the first exemplary embodiment are also able to be obtained by this second exemplary embodiment, that is, the dimensions in the transverse direction, i.e., the axial direction, of the drive system 130 can be shortened, good power transmission can be achieved, and the dimensions in the longitudinal direction, i.e., the radial direction, of the drive system 130 can be shortened. Just as disclosed in US Patent Application Publication No. 2003/0127262A1, arranging the lock-up clutch Ci on the inner peripheral side of the stator of the second motor-generator MG2 enables the dimensions in the transverse direction, i.e., the axial direction, to be shortened even more.

Figure 7:
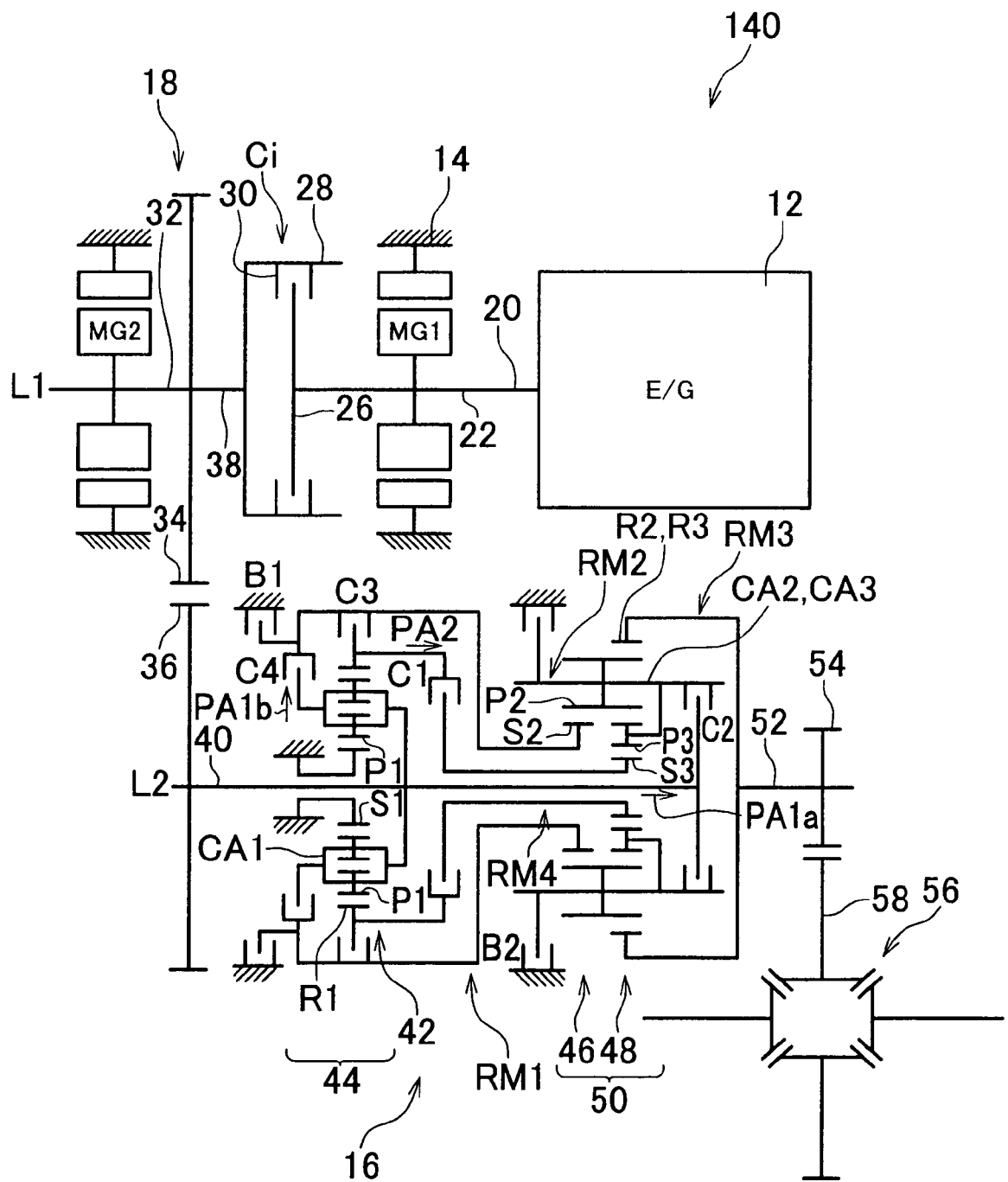
FIG. 7 is a skeleton view of the structure of a vehicular drive system according to a third exemplary embodiment of the invention.

Next, a third exemplary embodiment of the invention will be described. FIG. 7 is a skeleton view of the structure of a vehicular drive system (hereinafter simply referred to as "drive system") 140 according to the third exemplary embodiment of the invention. The drive system 140 differs from the drive system 10 of the first exemplary embodiment in that the positional relationships between the lock-up clutch Ci, the drive gear 34, and the second motor-generator MG2 on the first axis L1 are different. That is, in the drive system 140 according to the third exemplary embodiment, the order of the components on the first axis L1 from the engine 12 side is as follows: the engine 12, the first motor-generator MG1, the lock-up clutch Ci, the drive gear 34, and the second motor-generator MG2. Therefore, in this exemplary embodiment it is the second motor-generator MG2 that is provided at the opposite end from the engine 12 on the first axis L1.

The output shaft 38 of the lock-up clutch Ci and the rotor shaft 32 of the second motor-generator MG2 are connected in a manner such that they are unable to rotate with respect to one another. The drive gear 34 is provided on either the output shaft 38 or the rotor shaft 32 so as to be non-rotatable with respect thereto.

As described above, according to this exemplary embodiment, it is the second motor-generator MG2 that is provided on the opposite end from the engine 12 on the first axis L1, so the drive gear 34 is positioned farther on the engine 12 side than it is in the first and second exemplary embodiments. Meanwhile, the same automatic transmission 16 as in the first and second exemplary embodiments is arranged on the second axis L2 on the same side of the counter gear set 18 as it is in the first and second exemplary embodiments. Therefore, according to this exemplary embodiment, the first motor-generator MG1 and the second motor-generator MG2, which are arranged on the first axis L1, are offset in the axial direction with respect to the first brake B1 and the second brake B2 on the second axis L2. The motor-generators MG1 and MG2 and the brakes B1 and B2 are all elements that have large radial dimensions. Offsetting these elements in the axial direction therefore enables the dimensions in the radial direction, i.e., the longitudinal direction, of the drive system 140 to be shortened even more.

Also, just as in the drive system 10 according to the first exemplary embodiment, the drive system 140 according to this exemplary embodiment has the first motor-generator MG1, the second motor-generator MG2, and the lock-up clutch Ci arranged on the first axis L1 on which the crankshaft 20 of the engine 12 are arranged. Further, the automatic transmission 16, which has large radial dimensions, is arranged on the second axis L2 which is a different axis than the first axis L1 on which the first motor-generator MG1, the second motor-generator MG2, and the lock-up clutch Ci are arranged. Moreover, the engine 12 and the lock-up clutch Ci on the first axis L1 are parallel with the automatic transmission 16 on the second axis L2. As a result of this structure, the dimensions in the transverse direction, i.e., the axial direction, of the drive system 140 are able to be shortened. Also, the counter gear set 18 is used as the power transmitting means so the total number of shafts is able to be reduced. As a result, the dimensions in the longitudinal direction, i.e., the radial direction, of the drive system 140 are able to be shortened.

Figure 8:
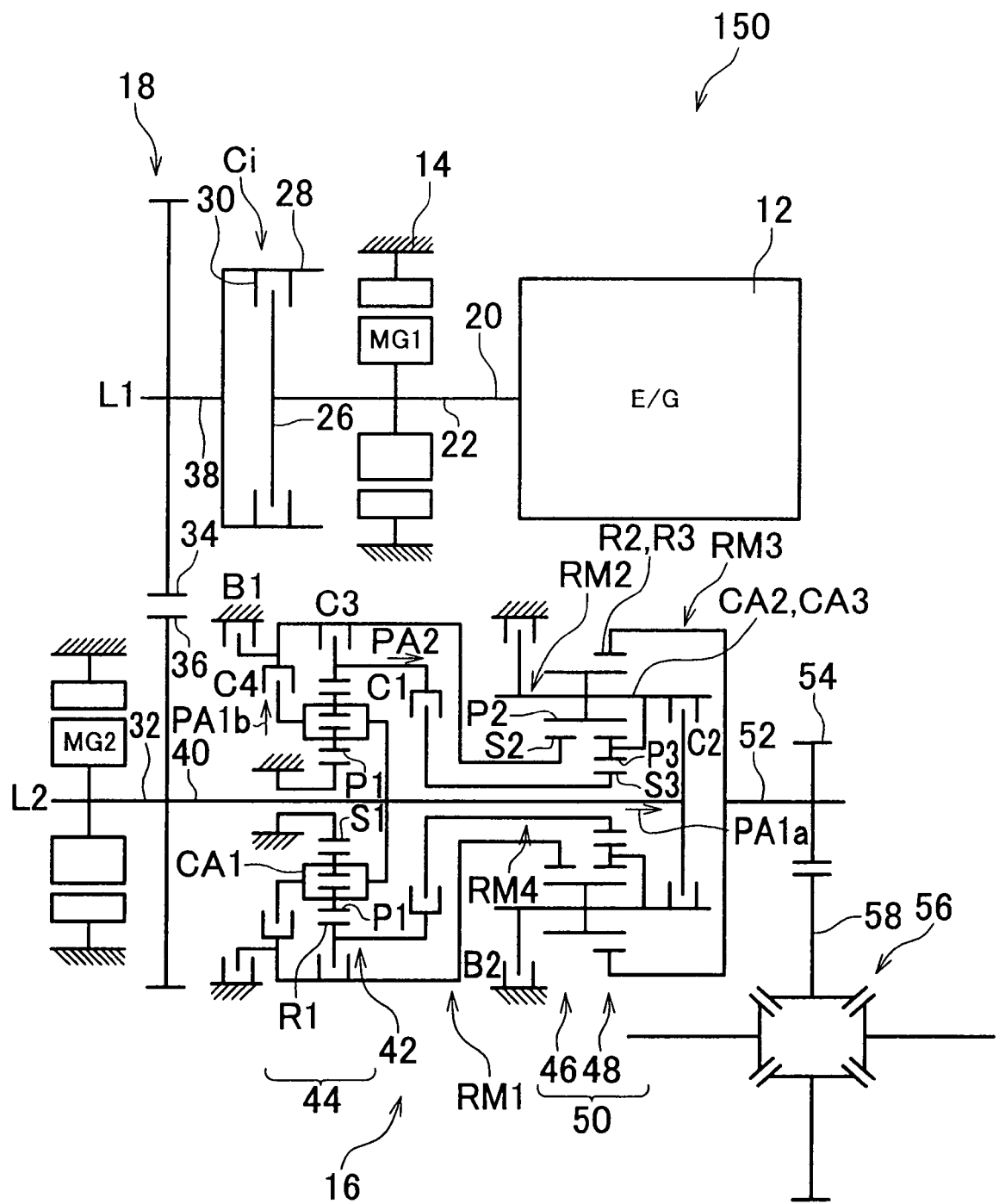
FIG. 8 is a skeleton view of the structure of a vehicular drive system according to a fourth exemplary embodiment of the invention.

Next, a fourth exemplary embodiment of the invention will be described. FIG. 8 is a skeleton view of the structure of a vehicular drive system (hereinafter simply referred to as "drive system") 150 according to the fourth exemplary embodiment of the invention. The drive system 150 differs from the drive system 140 of the third exemplary embodiment only in that, in the third exemplary embodiment the second motor-generator MG2 is arranged at the opposite end from the engine 12 on the first axis L1, whereas in the fourth exemplary embodiment the second motor-generator MG2 is arranged at the opposite end from the drive pinion gear 54 on the second axis L2.

That is, in the drive system 150 according to the fourth exemplary embodiment, only the engine 12, the first motor-generator MG1, the lock-up clutch Ci, and the drive gear 34 are arranged in that order from the engine side 12 on the first axis L1, which makes the structure on the first axis L1 extremely simple. On the other hand, the second motor-generator MG2, the driven gear 36, the automatic transmission 16, and the drive pinion gear 54 are arranged, in that order, on the second axis L2. The rotor shaft 32 of the second motor-generator MG2 and the input shaft 40 of the automatic transmission 16 are connected together so as not to be able to rotate relative one another, and the driven gear 36 is provided on either the rotor shaft 32 or the input shaft 40 so as not to be able to rotate relative thereto.

In the drive system 150, the structure to the engine 12 side of the counter gear set 18 is the same as that of the drive system 140 according to the third exemplary embodiment, with the first motor-generator MG1 on the first axis L1 being offset in the axial direction with respect to the first brake B1 and the second brake B2 on the second axis L2. The second motor-generator MG2 arranged on the second axis L2 is also offset in the axial direction with respect to the position of the first motor-generator MG1 on the first axis L1. Therefore, this exemplary embodiment also enables the longitudinal dimensions of the drive system 150 to be shortened.

Moreover, in the drive system 150 according to this exemplary embodiment, the first motor-generator MG1 and the lock-up clutch Ci are arranged on the first axis L1, on which is arranged the crankshaft 20 of the engine 12. Further, the automatic transmission 16, which has large radial dimensions, is arranged on the second axis L2 which is a different axis than the first axis L1 on which the first motor-generator MG1 and the lock-up clutch Ci are arranged. Moreover, the engine 12 and the lock-up clutch Ci on the first axis L1 are parallel with the automatic transmission 16 on the second axis L2. As a result of this structure, the dimensions in the transverse direction, i.e., the axial direction, of the drive system 150 are able to be shortened. Also, the counter gear set 18 is used as the power transmitting means so the total number of shafts is able to be reduced. As a result, the dimensions in the longitudinal direction, i.e., the radial direction, of the drive system 150 are able to be shortened.

Although the invention has been described herein with reference to specific embodiments, many modifications and variations therein will readily occur to those skilled in the art. Accordingly, all such variations and modifications are included within the intended scope of the invention.

What is claimed is:

1. A vehicular drive system comprising:
    an engine;
    a first electric motor;
    a second electric motor that is arranged on a first axis on which an output shaft of the engine is arranged;
    a transmission that is arranged on a second axis which is parallel with the first axis;
    a clutch that is arranged on the first axis to selectively connect and disconnect the second electric motor and the transmission to and from the engine, the transmission being arranged parallel to the engine and the clutch; and a power transmitting mechanism that transmits power on the first axis to an input shaft of the transmission.

2. The vehicular drive system according to claim 1, wherein the first electric motor is arranged on the first axis.

3. The vehicular drive system according to claim 2, wherein the clutch is arranged on the opposite side of the first electric motor and the second electric motor from the engine.

4. The vehicular drive system according to claim 2, wherein the clutch is arranged between the first electric motor and the second electric motor.

5. The vehicular drive system according to claim 1, wherein the power transmitting mechanism is arranged between the clutch and the second electric motor.

6. The vehicular drive system according to claim 1, wherein the transmission includes a planetary gear set and a brake which selectively stops the rotation of a rotating element of the planetary gear set, and wherein the second electric motor and the brake are arranged offset from one another in the axial direction.

7. The vehicular drive system according to claim 2, wherein the transmission includes a planetary gear set and a brake which selectively stops the rotation of a rotating element of the planetary gear set, and wherein the first electric motor and the brake are arranged offset from one another in the axial direction.

8. The vehicular drive system according to claim 1, wherein the power transmitting mechanism is arranged on the opposite side of the clutch from the engine.

9. The vehicular drive system according to claim 1, wherein the power transmitting mechanism is a gear set.

* * * * *